United States Patent
McManus

[15] 3,700,121
[45] Oct. 24, 1972

[54] RACK LOADING AND UNLOADING APPARATUS
[72] Inventor: Lynn S. McManus, Saginaw, Mich.
[73] Assignee: Baker Perkins, Inc., Saginaw, Mich.
[22] Filed: Feb. 22, 1971
[21] Appl. No.: 117,240

[52] U.S. Cl. ............................................. 214/16.4 C
[51] Int. Cl. ............................................... B65g 1/06
[58] Field of Search ............................... 214/16.4 C

[56] References Cited

UNITED STATES PATENTS

3,526,325   9/1970   Temple ................. 214/16.4 C

Primary Examiner—Gerald M. Forlenza
Assistant Examiner—R. Johnson
Attorney—Learman & McCulloch

[57] ABSTRACT

Rack loading and unloading apparatus for respectively transferring bakery products, such as pies in containers, from a supplying conveyor to a plurality of vertically spaced multi-shelved racks, which are moved in an endless path through a bakery processing unit, and removing products from the racks after they have been processed and transferring them to a discharge conveyor.

22 Claims, 22 Drawing Figures

INVENTOR
LYNN S. MC MANUS
BY
*Learman & McCulloch*
ATTORNEYS

INVENTOR
LYNN S. MC MANUS

BY

ATTORNEYS

RACK LOADING AND UNLOADING APPARATUS

FIELD OF THE INVENTION

This invention relates to bakery processing equipment and more particularly, to new and improved apparatus for loading and unloading bakery products to and from cooler or proofer racks which are provided with uniformly vertically spaced grid-like shelves.

BACKGROUND OF THE INVENTION

Apparatus of this character for handling bakery products commonly includes pusher mechanism for moving the bakery products to and from vertically spaced rack support shelves which are indexed upwardly along the elevator run of an endless circuit. Some bakery products, for example, baked pies in foil tins, must be handled very gently to prevent the pie fillings from spilling over the sides of the tins. For these purposes, conventional pusher mechanisms do not fully meet customer requirements. Accordingly, it is an object of the present invention to provide new and improved bakery product handling apparatus which will smoothly transfer such bakery products to and from the shelves of circulating racks in an enclosed cooler or the like.

It is a further object of the present invention to provide bakery product handling or transfer members which can be alternately interleaved with the tines of a grid-type support rack which permits maximum cooling of the products thereon and the spaced apart rollers of a roller conveyor to facilitate the smooth transfer of products therebetween.

Other objects and advantages of the present invention will become apparent to those of ordinary skill in the art as the description thereof proceeds.

THE SUMMARY

Briefly, in accordance with the present invention, there is provided apparatus for loading and unloading vertically indexing, product support racks, each having a plurality of shelves comprising horizontally spaced support tines, said apparatus including: a product supply conveyor; first transfer means including spaced tines movable from a product receiving position for receiving bakery products from the supply conveyor to a product discharge position in which the tines of the support shelves will pass between the tines of the transfer means to strip the products therefrom as the racks move upwardly, for instance; a discharge roller conveyor including a plurality of horizontally spaced rollers mounted below the supply conveyor; and an orbitally movable second transfer means including horizontally spaced tines for moving between the tines of the support shelves to strip the products therefrom and deposit them on the discharge conveyor as the tines of the second transfer means move between the rollers of the discharge conveyor.

The present invention may more readily be described by reference to the accompanying drawings in which.

GENERAL DESCRIPTION

Figure 2:
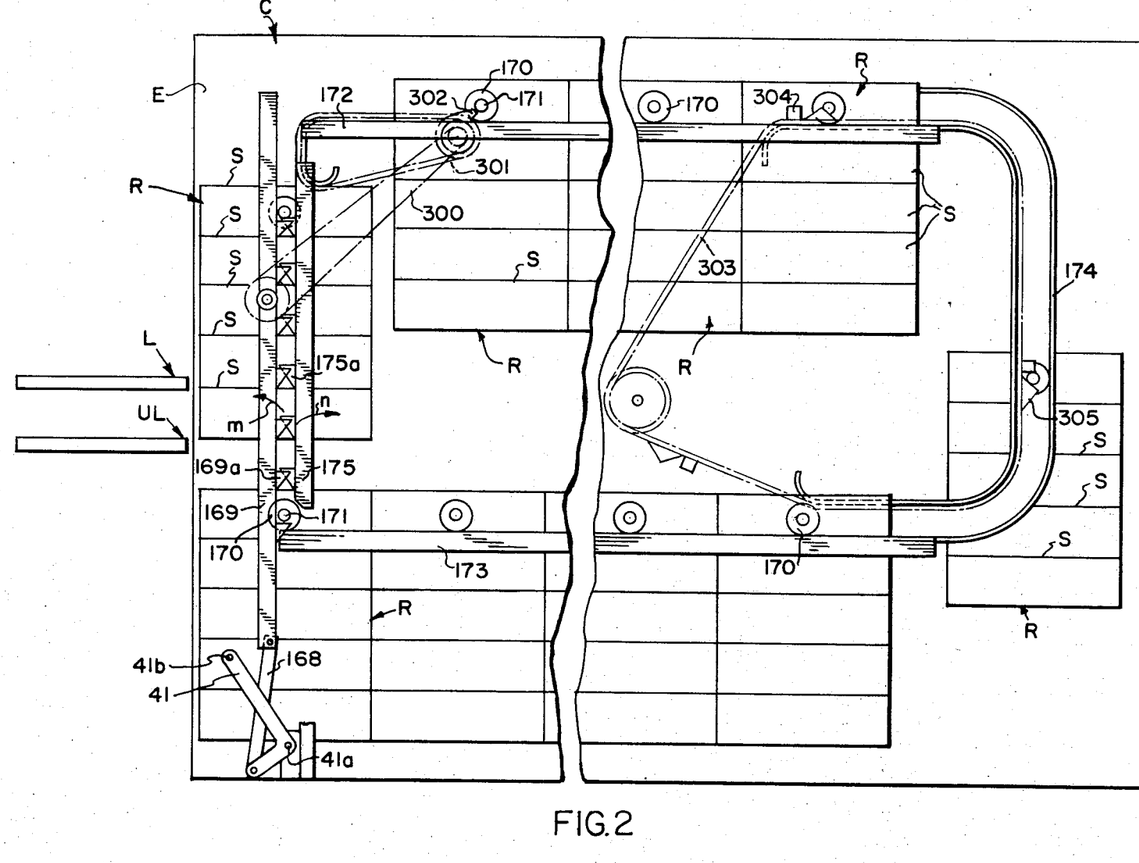
FIG. 2 is a fragmentary, schematic, side elevational view illustrating a typical bakery processing unit employing endlessly circulating racks with which loading and unloading apparatus formed according to the present invention may be utilized, various parts being omitted in the interest of clarity.

Apparatus constructed according to the invention is particularly adapted for use with a bakery product processing unit such as a cooler, shown generally at C in FIG. 2, including a plurality of bakery product support racks R movable in an endless path in a vertical plane within an enclosure E. Each of the racks R includes a plurality of vertically spaced grid-like shelves S comprising horizontally spaced tines *f* for supporting bakery products, such as pie-filled tins or foils, which are generally designated P.

The bakery processing apparatus C (FIG. 2) may comprise a bakery proofer, cooler or the like such as the cooling unit disclosed in U.S. Pat. No. 3,319,806 granted May 16, 1967 to H. E. Temple, assigned to the assignee of the present invention, and incorporated herein by reference. A plurality of vertically disposed racks R are circulated in the manner disclosed therein and at the elevator run are indexed upwardly by the mechanism disclosed in the patent, past superposed loading and unloading stations L and UL respectively, at which the rack shelves are first unloaded and thence reloaded with the products to be treated. Support rollers 170, mounted on transversely projecting shafts 171 fixed to the sides of the racks R support the racks R on transversely spaced upper and lower support rails 172 and 173 and guide along lowerator guide rails 174 as the racks R move in an endless path as disclosed in the referenced patent.

The manner in which the bars 169 at each side of the elevator run are reciprocated to lift the racks successively from one station level 175a to the next is described in detail in the patent mentioned. Drive chains 300 may be utilized to drive rack advancing chains 301 in the conventional manner and move the racks R along the upper run rack support rails 172 after they have been transferred from the elevator run in the manner described in the patent, there being lugs 302 provided on the advancing chains 301 to engage the shafts 171 on the rack R which has just been moved over from the elevator run and in this way push it from left to right in FIG. 2, and move all racks R along the upper run rails 172, supported on the rack rollers 170. At the opposite lowerator end of the continuous circuit, drive chains 303 are provided which includes drive lugs 304 and releasable latch members 305 of the character described in the patent mentioned. This mechanism will not be described in detail, except to state that the latches 305 are biased to the outward position to cooperate with the lugs 304 and move a rack R down the lowerator defined by lowerator guides 174 before transferring it to the lower run rack supporting rails 173 which proceed along the bottom of the cooler enclosure E. When a rack R returns to the elevator run formed by stationary member 175 and its rack support stations 175a, it is transferred upwardly a distance equal to the spacing between shelves S with each stroke of lift bars 169 in the manner described so that cooled products may be unloaded from a shelf at the unloading station UL and new products immediately reloaded at loading station L. The reciprocatory form of drive utilized inherently provides an adequate dwell providing ample time for loading and unloading to be accomplished while the rack is being supported at each support station level 175a.

A vertically movable product supplying conveyor, generally designated 10, including a plurality of longitudinally spaced rollers 12, is provided for delivering tins or pie foils P in a longitudinal path to a loading position adjacent the cooler C. Transfer apparatus, generally designated 14, including a plurality of longitudinally spaced tines 16 interspersed with the rollers 12 and providing a transfer member 16', is provided for receiving the tins P when the conveyor 10 is moved downwardly, and then moving the bakery products P toward the left as viewed in FIG. 1, into the path of the upwardly moving shelves S so that the shelf grid tines f pass between the tines 16 to strip the products therefrom. The racks R carry the tins P of bakery products through the cooling unit C in an endless path and return them to the unloading station UL, which is slightly below the loading station L.

To unload the products P which have been processed in the cooling unit C, unloading transfer apparatus, generally designated 18, is provided and includes a plurality of spaced apart tines 20 forming a transfer member 20' which is movable upwardly between the tines f of a shelf positioned at the unloading station UL to strip the tins P therefrom. A discharge conveyor, generally designated 24, is disposed below the conveyor 10 and includes a plurality of longitudinally spaced driven rollers 26 for receiving the products P from the unloader 18 and moving them to a discharge station. Mechanism, to be later described, is provided for moving the raised unloader tines 20 from a position adjacent a cooler rack R to a position above the discharge conveyor rollers 26 and for then lowering the tines 20 so that they pass between the rollers 26 to deposit the tins P thereon.

THE SUPPLY CONVEYOR

Apparatus constructed according to the present invention is mounted on a frame, generally designated F, which includes vertical and horizontal frame members 30 and 32, respectively, welded or otherwise suitably secured together and mounting walls or panels 36.

Figures 1, 2A:
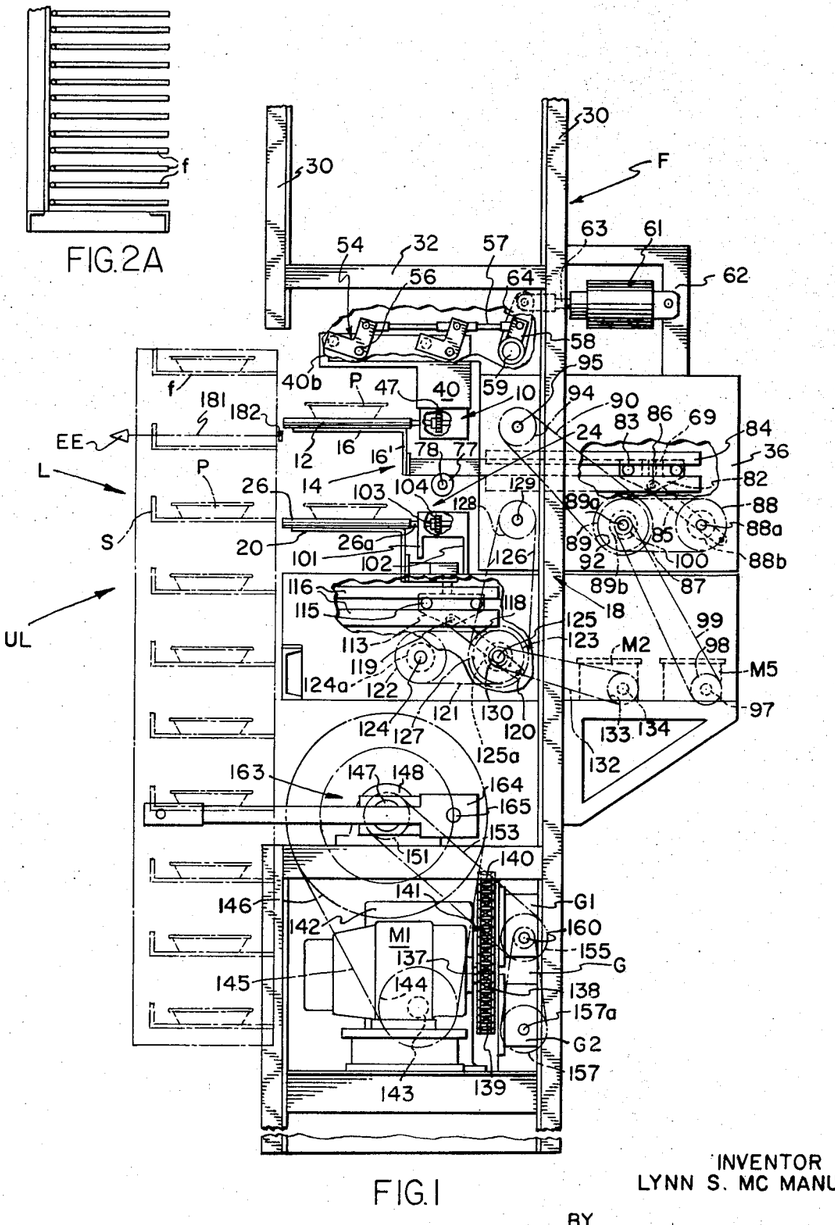
FIG. 1 is a fragmentary, side elevational view illustrating apparatus for loading and unloading a bakery processing unit such as an enclosed cooler, and drive mechanism for moving the circulating product supporting racks, parts being broken away to more clearly illustrate certain portions of the apparatus.
FIG. 2A is a top plan, fragmentary view illustrating a typical rack in the bakery processing unit.
Figure 3:
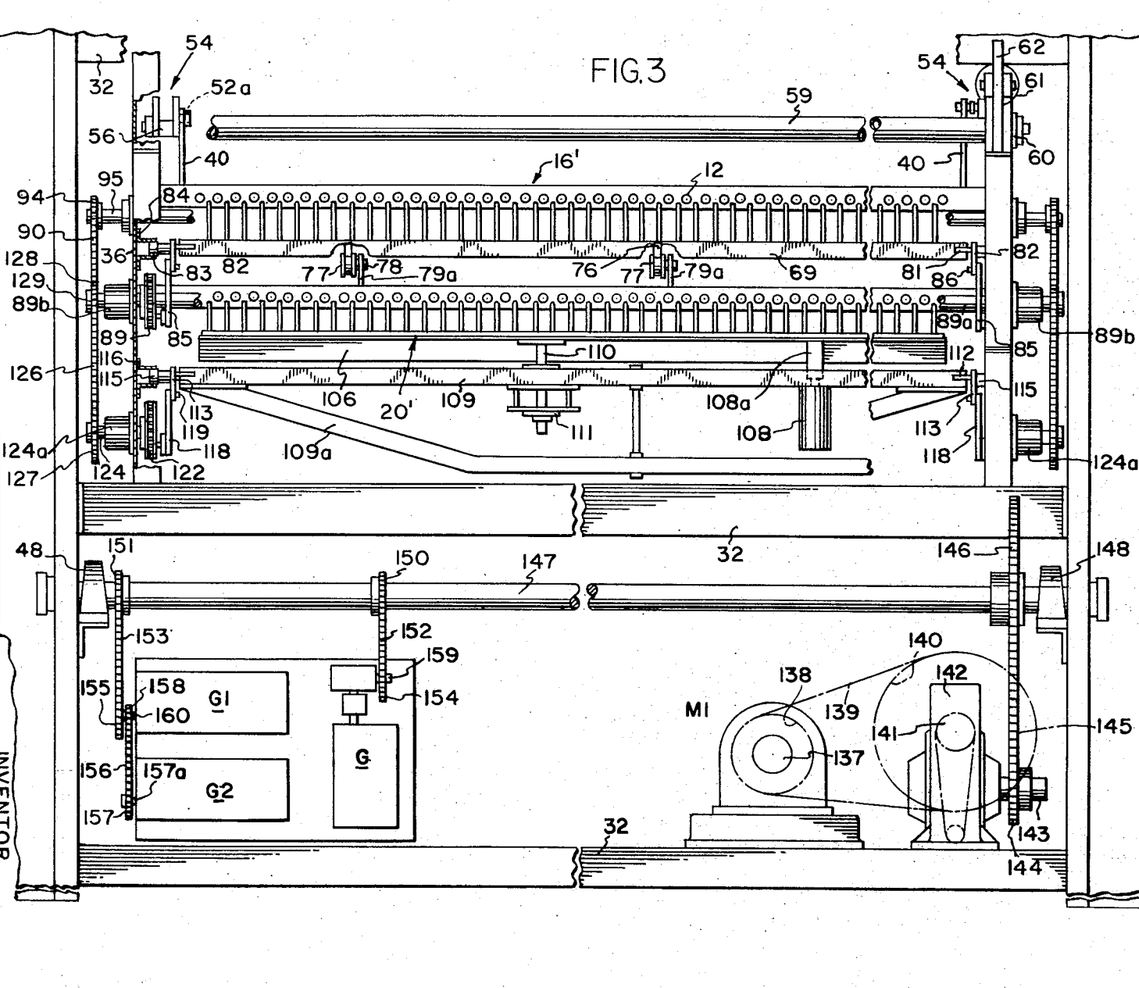
FIG. 3 is a front elevational view of the apparatus illustrated in FIG. 1, parts being broken away to better illustrate certain portions of the apparatus.
Figure 5:
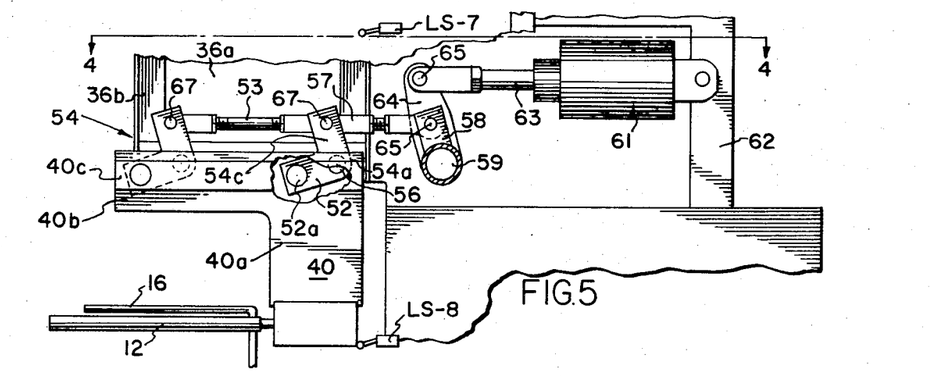
FIG. 5 is an enlarged, sectional front elevational view taken along the line 5—5 of FIG. 4, and particularly illustrating apparatus for raising and lowering the bakery product supplying conveyor.
Figure 6:
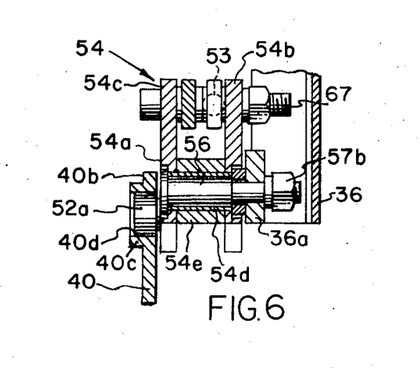
FIG. 6 is an enlarged sectional view taken along the line 6—6 of FIG. 4.
Figure 7:
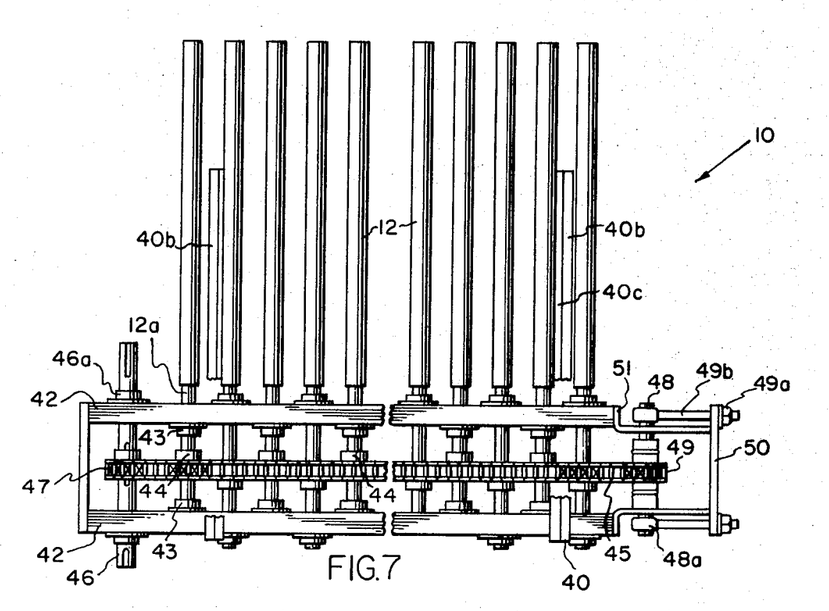
FIG. 7 is an enlarged top plan view illustrating only the supplying conveyor, which is turned 90° relative to the position in which it is illustrated in FIG. 4.
Figure 8:
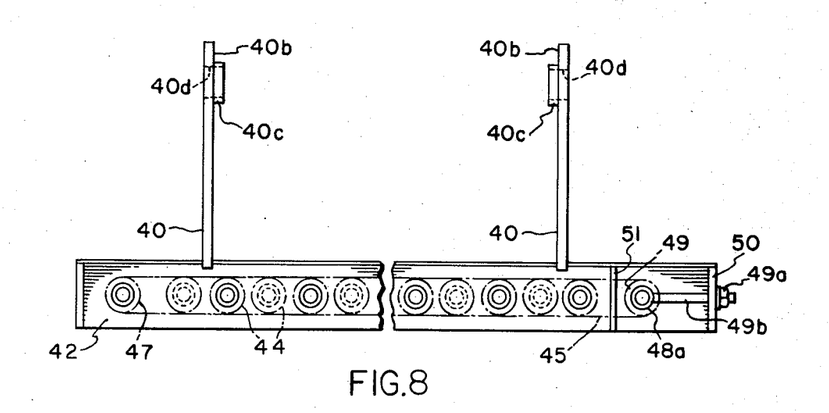
FIG. 8 is an enlarged side elevational view of the conveyor illustrated in FIG. 7.

The supply conveyor 10 includes a pair of longitudinally extending rails 42 supported on the vertical leg portions 40a of a pair of inverted L-shaped, vertically movable, longitudinally spaced, hanger brackets 40 (FIGS. 1, 3 and 8). The rollers 12 may each include a reduced end portion 12a journaled in a pair of bearings 43 (FIG. 7) provided in the rails 42 to provide a cantilever support therefor. A drive sprocket 44 (FIG. 7) is fixed to each of the reduced end portions 12a between the bearings 43. The output shaft (not shown) of a motor, designated M3 (line L12, FIG. 21), is drivingly connected with a drive shaft 46 which is journaled by bearings 46a in the rails 42 and mounts a drive sprocket 47. At the opposite end of the conveyor 10, an idler shaft 48, journaled by bearings 48a provided in hangers 49b, mounts an idler sprocket 49. A drive chain 45 is trained around the sprockets 47 and 49 and the roller driving sprockets 44. A pair of L-shaped brackets 51, fixed to the rails 42, support an end wall 50 to which the hangers 49b are adjustably connected by suitable nuts 49a. Welded or otherwise suitably secured to the horizontal leg portions 40b of the hangers 40 are reinforcing strips 40c (FIGS. 5 and 8) provided with apertures 40d which receive conveyor suspending pins 52a.

A pair of side plates 36a (FIG. 4) are attached to the side frame members 36 by angle irons 36b. Mounting the supply conveyor 10 for vertical movement, are pairs of bell crank assemblies 54 provided at opposite ends of the conveyor 10. Each bell crank assembly 54 includes a bell crank 54a having an upwardly extending leg portion 54c connected to a longitudinally spaced, upwardly extending arm 54b by a collar portion 54e which is pivotally supported on a shoulder bolt 56 by a bearing 54d. The bolts 56 are fixed to the side plates 36a by nuts 57b. The horizontal leg portions 52 of the bell cranks 54a include laterally projecting hanger mounting pins 52a which, as noted, are pivotally received in the apertures 40d provided in the hangers 40.

Spanning the vertical leg portions 54c and 54b of the bell crank assembly 54 are coupling shafts or pins 67. A pair of connecting rods 53 are pivotally supported on the coupling pins 67 at opposite ends of the conveyor 10 for coupling the pivotal movement of the individual bell crank assemblies 54 to insure uniform raising and lowering of the entire conveyor 10.

Figure 4:
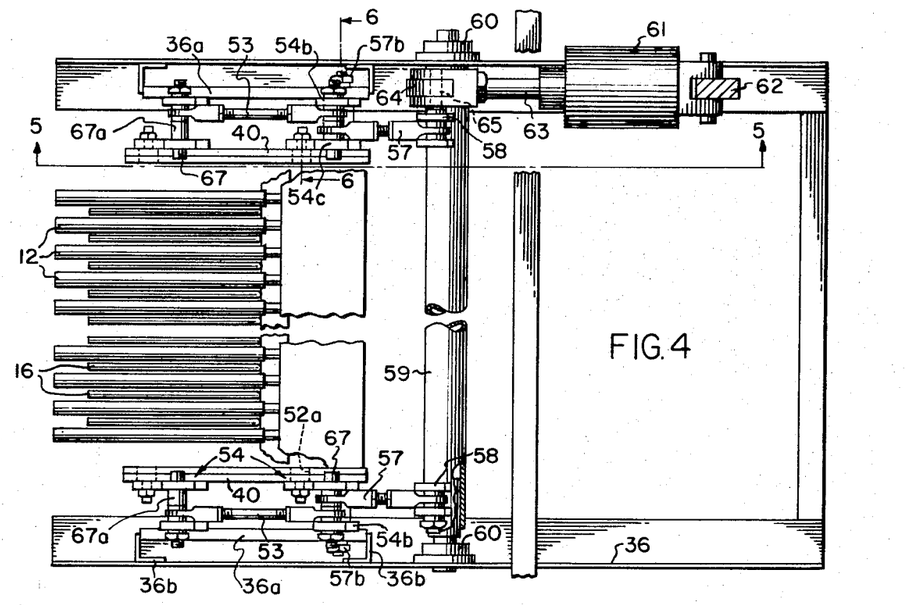
FIG. 4 is an enlarged, top plan view taken along the line 4—4 of FIG. 5, and particularly illustrating the bakery product supplying conveyor and the apparatus for raising and lowering the supplying conveyor.

As viewed in FIG. 4, a pair of spacers 67a is provided on the coupling pins 67 of the two left-hand bell crank assemblies 54 to prevent shifting of the coupling rods 53. As also viewed in FIG. 4, the pins 67 on the two right-hand bellcrank assemblies 54 are pivotally connected to drive rods 57 which are pivotally connected with a pair of longitudinally spaced crank arms 58 fixed on a shaft 59 which is journaled at opposite ends by bearings 60 mounted on the frame walls 36. For rotating the shaft 59, a double acting, solenoid actuated fluid operated cylinder 61 is mounted on a frame mounted bracket 62 and includes a piston rod 63 pivotally connected, by a pin 65, to a drive link 64 fixed to the shaft 59. As the piston rod 63 is advanced, the hangers 40 pivot downwardly in an arc having a long radius about the shoulder bolts 56 to move the conveyor 10 downwardly from the position shown in FIG. 16 to the position shown in FIG. 17 and gently deposit the tins P on the loader tines 16.

THE LOADING APPARATUS

Figure 9:
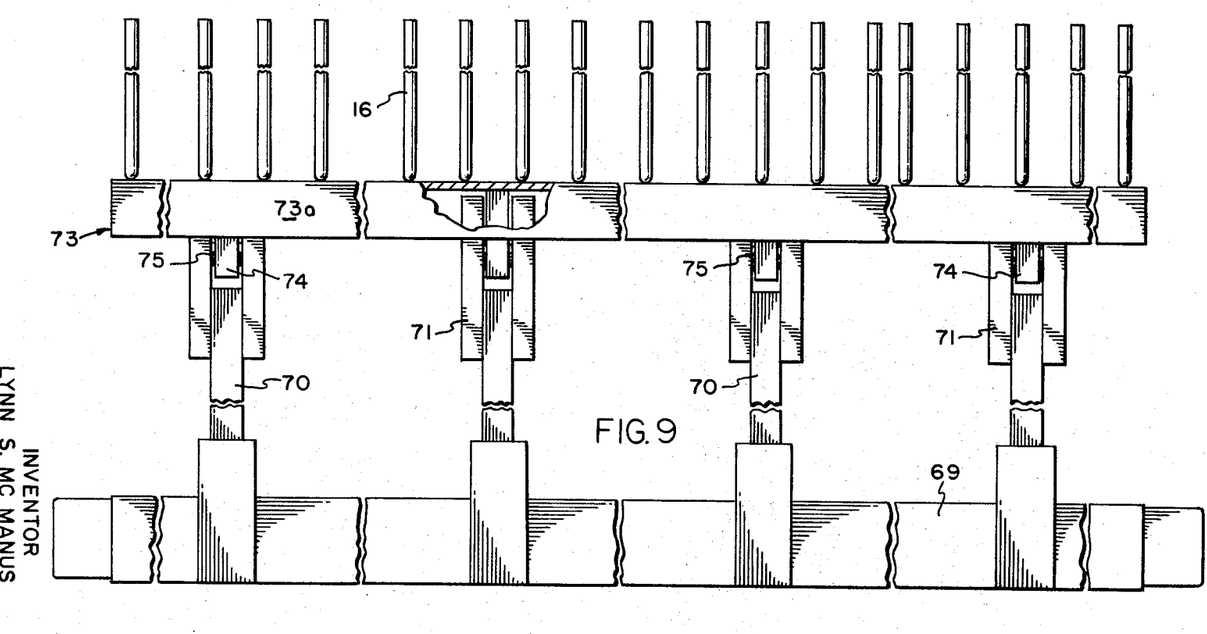
FIG. 9 is an enlarged top plan view illustrating only the loading elements for transferring bakery products from the supplying conveyor to the shelves of the support racks in the processing unit.
Figure 10:
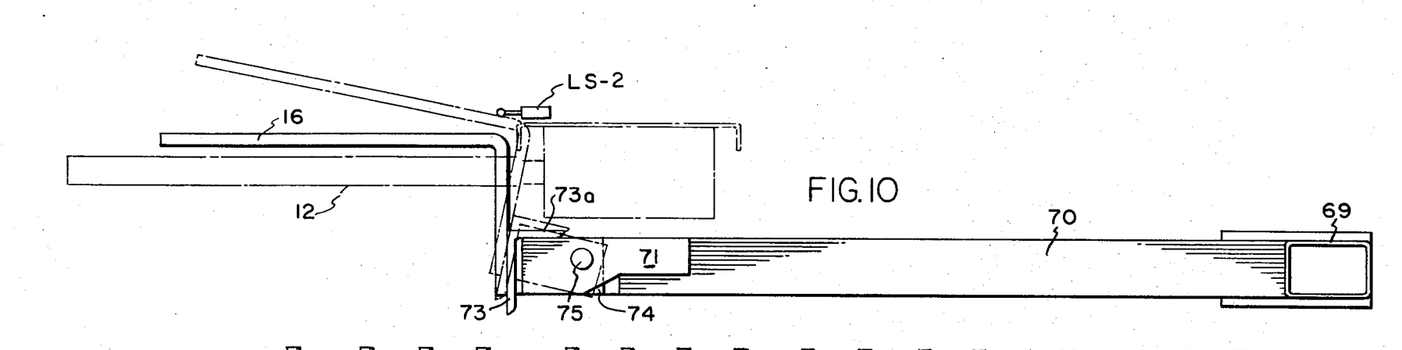
FIG. 10 is an enlarged side elevational view of the loader elements illustrated in FIG. 9.
Figure 17:
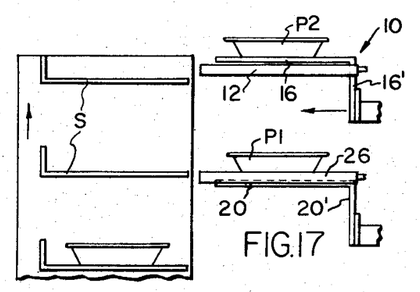

The loader tines 16 (FIGS. 9 and 10), which receive the tins P from the conveyor 10 as the rolls 12 move downwardly therebetween to the position shown in FIG. 17, are L-shaped and are welded or otherwise suitably secured to a tine mounting bar 73. The tine mounting bar 73 includes a plurality of mounting lugs 74 pivotally connected, by pins 75, to longitudinally spaced clevises 71 which are fixed to the terminal ends of longitudinally spaced rods 70, bolted or otherwise suitably secured to a longitudinally extending bar 69 (FIGS. 9 and 10). The tine mounting bar 73 includes a horizontal flange portion 73a which engages the clevis members 71 to prevent the tines 16 from swinging downwardly from the position shown in FIG. 10, while permitting the tines 16 to be swung upwardly about the pivot pins 75 to their chain line positions (FIG. 10) for a purpose to be later described. Two of the bars 70 ride on rollers 77 rotatably supported on pivot pins 78 journaled in trunnions 79a fixed to the frame F in any suitable manner, such as by welding. The bar 69 is connected at opposite ends to guide roller mounting carrier plates 82 (FIG. 3) by pins 81.

Figure 18:
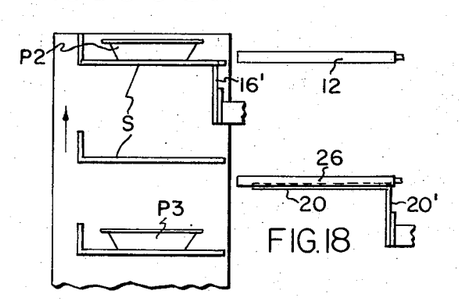
Figure 19:
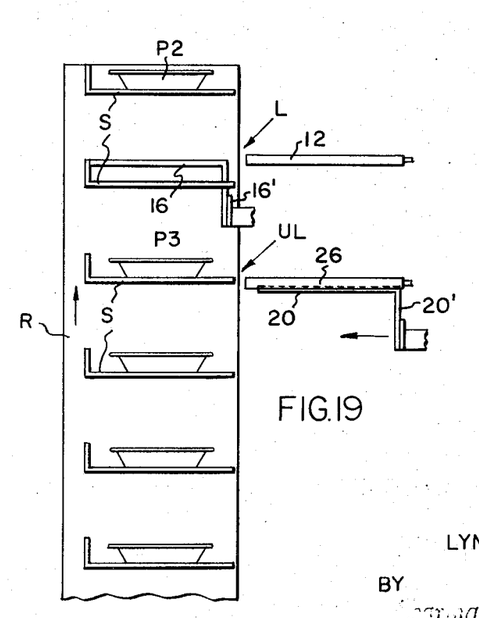
Figure 20:
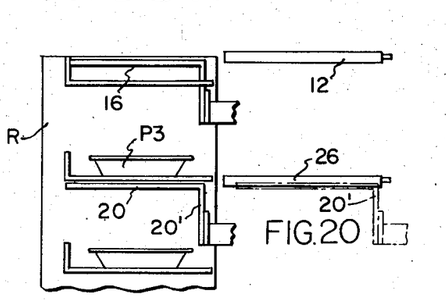
Figure 21:
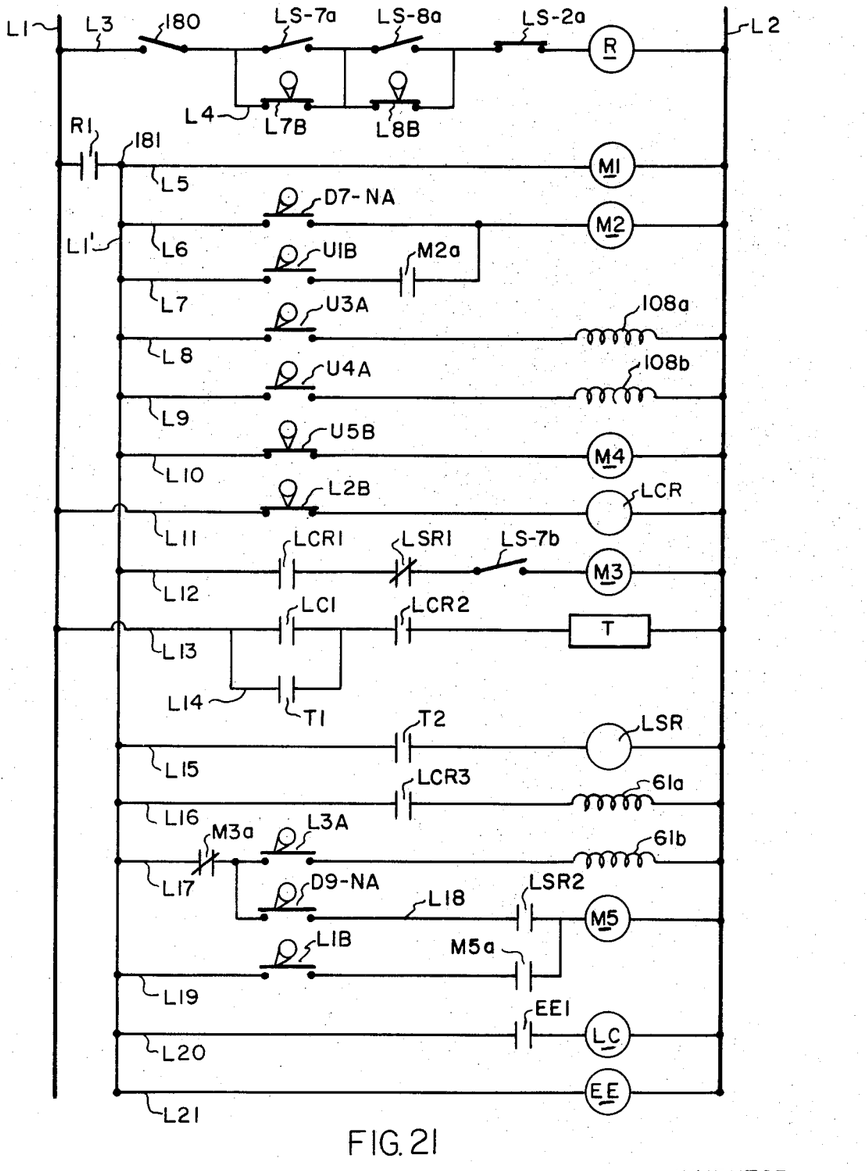
FIG. 21 is a schematic diagram of an electrical control circuit for controlling the apparatus illustrated in FIGS. 1 – 10.

Each roller mounting carrier plate 82 mounts a pair of follower rollers 83 received in a trackway formed by upper and lower guide rails 84 (FIGS. 1 and 3), which are supported on the frame side walls 36. The plates 82 and the loader are moved in a to-and-fro horizontal path by means of a pair of chain driven arms 85, each having one end pivotally connected to one of the plates 82 by a pivot pin 86, each arm 85 also being pivotally coupled at its opposite end in any suitable manner to one of a pair of chains 87. The chains 87 are trained around pairs of sprockets 88 and 89 fixed on shafts 88a and 89a which are journaled by bearings 88b and 89b respectively, supported on the side walls 36. Each arm 85 is carried by its associated chain 87 in the endless path and causes the tines 16 to move from the positions illustrated in FIG. 17 to the positions illustrated in FIG. 18. The shaft 89a is driven by a chain 99 trained around a sprocket 100 fixed to the shaft 89a and a sprocket 98 fixed on the drive shaft 97 of an intermittently operated electric motor M5 (FIG. 21).

At each end of the conveyor 10, a chain 90 is trained around another sprocket 92 fixed to the shaft 89a and a sprocket 94 fixed on a shaft 95. In this manner, the loader guide mechanisms 82 on opposite sides of the machine are coupled for simultaneous movement.

THE BAKERY PROCESSING UNIT

Apparatus for indexing the racks R upwardly to positions of support provided along the front rail 175 in timed relation with the to-and-fro movement of the loader 14 and unloader 18 comprises a drive motor M1 (FIG. 3) having an output shaft 137 mounting a sprocket 138 in driving engagement with a chain 139 trained around a sprocket 140 mounted on the input shaft 141 of a gear reduction mechanism 142. One of the output shafts 143 of the gear reduction mechanism 142 mounts a sprocket 144 in driving engagement with a chain 145 which is trained around a sprocket 146 mounted on a shaft 147 supported in bearings 148 fixed to the frame F. A pair of sprockets 150 and 151 are fixed to the shaft 147 and drive a pair of link chains 152 and 153, which are trained around a pair of sprockets 154 and 155, mounted on the drive shafts 159 and 160 respectively of a pair of "Gemco" cam operated switching mechanisms G and G1 respectively. Another "Gemco" cam operated switching mechanism G2 is mounted on the frame F and includes a sprocket 157 on a shaft 157a coupled with the "Gemco" cam operated switching mechanism G by means of a chain 156 trained around the sprockets 157 and 158. As will be more fully described hereinafter, each of the "Gemco" switching mechanisms G, G1, and G2 include a plurality of cam operated switches which control the sequential operation of the motors M — M5 (See FIG. 21).

A pair of drive members 163 (FIG. 1), for indexing the racks R upwardly along the elevator run, are also driven by the shaft 147 and are drivingly connected to a pair of pitman rods 164 by pivot pins 165. The opposite ends of the pitman rods 164 are pivotally connected by pivot pins 41b on a pair of bell cranks 41 (FIG. 2) pivotally mounted on the frame F at 41a. As the cranks 41 swing about the pivot pins 41a, arms 168 pivotally connected to the opposite arms of the cranks 41, move upwardly to lift the bars 169 upwardly another increment.

A plurality of rack engaging fingers or dogs 169a are pivoted on the bars 169 and are normally urged to the projected positions, illustrated in FIG. 2, by springs (not shown) and are retracted in the direction illustrated by the arrow m, when the bars 169 are indexed downwardly to their starting positions. A plurality of article supporting fingers or dogs 175a are mounted on the vertically extending members 175 and are urged to the projected positions illustrated in FIG. 2 by springs (not shown). The fingers 175a are retracted in the direction of the arrow n by the rack supporting shafts 171 as the racks are indexed upwardly. When the bars 169 are indexed downwardly, the rack supporting shafts are supported on the dogs 175a and are held in position. The construction and operation of this structure is identical to that described in the referenced U.S. Pat. No. 3,319,806.

THE UNLOADING APPARATUS

The unloader apparatus 18, for transferring to tins P successively from the shelves of the racks R in the cooling unit C to the discharge conveyor 24, after the products have been processed, includes a plurality of L-shaped, longitudinally spaced tines 20, welded or otherwise suitably secured to a mounting bar 106 (FIG. 3) which is supported by the piston rod 108a of a double acting, solenoid actuated, fluid operated cylinder 108 mounted on a carriage cross bar 109. A rigidifying structural member 109a is fixed to the underside of the cross bar 109. The bar 109 is supported at opposite ends by pins 112 on a pair of guide roller carrier plates 113. A plurality of unloader guide bars 110 for guiding the vertical movement of the tines 20, are also fixed to the underside of the mounting bar 106 and are received in complementally formed guides 111 fixed to the bar 109.

The unloader carrier plates 113 each include a pair of spaced apart rollers 115 which are received in a trackway formed by upper and lower rails 116 fixed to the opposite side walls 36. The carrier plates 113 are each pivotally connected to one end 119 of a drive rod 118 which has its other end 120 pivotally connected with a chain 121 trained around a pair of sprockets 122 and 123 which are fixed on a pair of shafts 124 and 125 journaled by bearings 124a and 125a respectively on the opposite side walls 36.

Power for driving the chains 121 on the left side of the unloader, as viewed in FIG. 1 and 3, is supplied by a drive sprocket 130 mounted on the shaft 125 and driven by a chain 132 trained around a sprocket 133 fixed on the output shaft 134 of the unloader drive motor M2. Simultaneous movement of the drive rod 118 and chains 121 on the right side of the unloader 18 is insured by means of chains 126 trained around sprockets 127 fixed to the shafts 125 and sprockets 128 fixed on a rotatable shaft 129 spanning the opposite sides of the unloader 18.

THE DISCHARGE CONVEYOR

The construction of the discharge conveyor 24 is generally similar to that of the supply conveyor 10, however, it is stationarily mounted. The driven rollers 26 of the discharge conveyor 24 include reduced end portions 26a which are journaled in a pair of walls 101 and 102 by suitable bearings (not shown) and mount sprockets 103 having a chain 104 trained therearound. One of the rollers 26 mounts an additional sprocket (not shown) which is drivingly connected to the output shaft of an electric motor M4 (FIG. 21) for driving the rollers 26 in unison.

THE CONTROL CIRCUIT

Referring now more particularly to FIG. 21, the circuit for controlling the apparatus illustrated in FIGS. 1 — 20, includes a pair of lines L1 and L2 connected to a suitable source of electrical power such as 110 volt, 60 cycle, alternating current. A pair of limit switches LS-7 and LS-8 (FIG. 5) are mounted on the frame in the vertical path of the endwisely disposed conveyor 10, and are actuated when the loading conveyor 10 is in the raised and lowered positions respectively. The limit switch LS-7 includes normally open sets of contacts LS-7a and LS-7b in lines L3 and L12 respectively, which are closed when the limit switch LS-7 is actuated by the conveyor 10 moving to the raised position. The limit switch LS-8 includes a set of contacts LS-8a in line L3 which is closed when the conveyor 10 moves to the lowered position to actuate the limit switch LS-8. IF, for any reason, a tin P is not unloaded from a rack R at the unloading station UL, the tin P, as it is moved upwardly, will engage the underside of the loader tines 16 to pivot the tines 16 upwardly about the pivot pins 75 (FIG. 9) to actuate limit switch LS-2 (FIG. 10), mounted on the frame F in any suitable manner, to open a set of normally closed contacts LS-2a connected in line L3. The start switch 180, limit switch contacts LS-7a, LS-8a, and LS-2a are connected in series circuit relation with a starting relay R in line L3. The cooler drive "Gemco" cam operated switching mechanism G includes cams which are sequentially operated to sequentially open and close contacts D7-NA and D9-NA in lines L6 and L18 respectively. The loader cam operated switching mechanism G1 is operated to sequentially close cam operated contacts L1B and L3A in lines L19 and L17 respectively and to open the normally closed contacts L2B in line L11 and L7B and L8B in line L4. The contacts L7B and L8B are opened when the loading conveyor would normally be in the raised and lowered positions respectively. If the conveyor 10 is in the proper position when the switches LS-7b and LS-8b open, circuit continuity is maintained to the relay R in line L3 to maintain the normally open contacts R1 closed in line L5. The armature of the drive motor M1 is connected in series with the normally open contacts R1 in line L5 to continuously reciprocate the bars 169 (FIG. 2) and sequentially index the shelves S upwardly. The timing shaft 147 (FIG. 3) is also continuously driven to drive the "Gemco" switching mechanisms G, G1 and G2.

Connected to the junction of the relay contacts R1 and main driving motor M1 is a sub-circuit line L1'. Connected between the line L1' and the line L2 in line L6 are the cam operated unloader start contacts D7-NA which close momentarily when the shelf S to be unloaded stops at the unload station UL, to energize the armature of the unloader electric motor M2 connected in series therewith.

The unloader "Gemco" cam operated switching mechanism G2 includes a plurality of rotated cams for sequentially opening and closing switches U1B, U3A, and U5B connected in lines L7 – L10 respectively. Connected in parallel with the cam operated unloader start contacts D7-NA is a series circuit comprising the normally open holding contacts M2a, which close when the unloader motor M2 is energized, and the normally open unloader stop contacts U1B which close when the unloader 18 starts to move from its normal position below the discharge conveyor 18. The contacts U1B open immediately when the unloader 18 is again fully retracted to its start position.

A pair of solenoids 108a and 108b is provided for directing fluid to the unloader cylinder 108 for respectively raising and lowering the unloading transfer member 20'. The unloader "raise" contacts U3A are connected in series circuit with the advance solenoid 108a in line L8 for raising the unloader transfer member 20'. The contacts U4A are connected in series with the retract solenoid 108b (line L9) for lowering the unloader transfer member 20'. The armature of the discharge conveyor motor M4 (line L10) is connected in series with the cam operated normally closed discharge conveyor stop contacts U5B which are opened and reclosed just prior to the unloader reaching its normal stop position. This temporarily stops the rollers 26 and prevents the tins P from being suddenly accelerated as they are deposited thereon.

The normally closed, cam operated, load conveyor start contacts L2B are connected in line L11 to energize the load control relay LCR connected in series circuit therewith. The contacts L2B open when the loader 14 is moved over to the load conveyor 10 and again close when the loader tines 16 clear the supply conveyor rollers 12. The relay LCR includes sets of normally open contacts LCR1 and LCR2 in lines L12 and L13 which close when relay LCR is energized. A set of normally closed contacts LSR1, which open when the relay LSR in line L15 is energized, is connected in series circuit with the normally open contacts LCR1, the normally open limit switch contacts LS-7b, and the supply conveyor motor M3 for driving the supply conveyor rollers 12. Thus, when the tines or fingers 16 are moved to a position beneath the supply conveyor rollers 12, the rollers 12 cease to be driven and remain stationary when the supply conveyor 10 is later lowered so that the tins P do not tend to move forwardly as they are transferred to the fingers 16. As soon as the fingers 16 clear the rollers 12, the motor M3 is again energized as the contacts LCR1 close.

A photoelectric eye, shown generally at EE in FIG. 1, is mounted on the cooler unit C at the loading station L and includes a set of contacts EE1 in line L20 which is closed when a beam 181 emanating from a source of light 182 on the opposite side of the loading station L is transmitted without interruption. The contacts EE1 (line L20) are connected in series with a "loader clear" relay LC which includes a set of normally closed contacts LC1 which open when the relay LC is energized. If no product is present at the loader station, the contacts LC1 will be closed. The contacts LC1 are connected in line L13 with the normally open contacts LCR2 and a timer T such as the type 9050-ROID, manufactured by Eagle Manufacturing Company of Davenport, Iowa. The timer T includes a set of normally open holding contacts T1 which close when the timer T has timed out, and a second set of normally open contacts T2, connected in series with a relay LSR in line L15, which close when the timer T "times out." When the relay LCR in line L11 is energized, the contacts LCR3 in line L16 close, to energize the retract solenoid 61a for raising the supply conveyor 10 to the raised position shown in full lines in FIG. 1. The solenoid 61b (line L17), when energized, is operated to direct fluid to the supply conveyor raising and lowering cylinder 61 so as to lower the supply conveyor rollers 12 between the loader tines 16 (FIGS. 1 and 5) and transfer tins P thereto. The normally open, load conveyor lowering, cam operated contacts L3A (line L17) are connected in series with the load conveyor lowering solenoid 61b and the normally closed contacts M3a, which are opened if the motor M3 is operating to drive the supply conveyor rollers 12. Also connected between the contacts M3a (line L17) and the line L2 are the loader start contacts D9-NA (line L18) which momentarily close when a shelf S to be loaded starts to elevate, the normally open relay contacts LSR2, and the armature of the loader operating motor M5 for driving the chain 99 so as to move the loader 14 from its normal position, in the path of the racks R, to the position shown in FIG. 1. Connected between the junction of the contacts LSR2 and the loader operating motor M5 (line L19) are the normally open cam operated loader stop contacts L1b which open immediately when the loader 14 is fully retracted (to the shelf area) and close again just as the loader starts to move.

THE OPERATION

Figure 11:
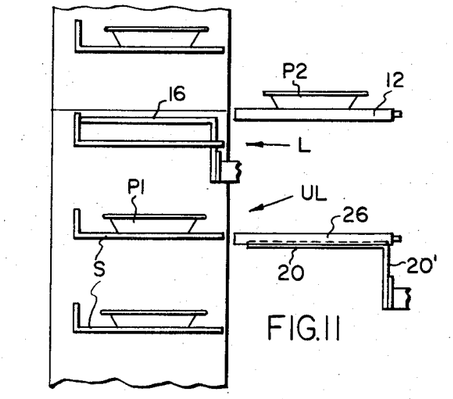
FIGS. 11 – 20 depict sequential positions of the loading and unloading apparatus during one complete cycle of operation.
Figure 12:
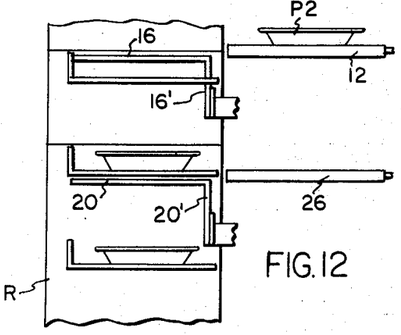
Figure 13:
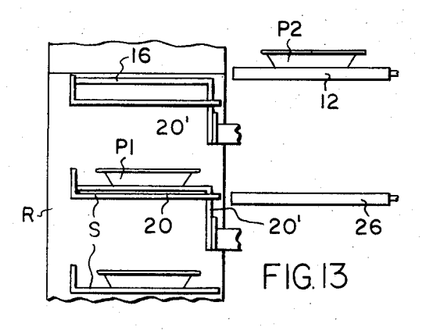
Figure 14:
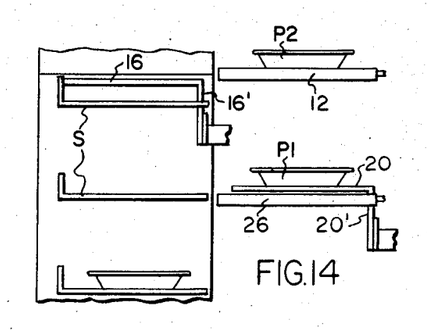
Figure 15:
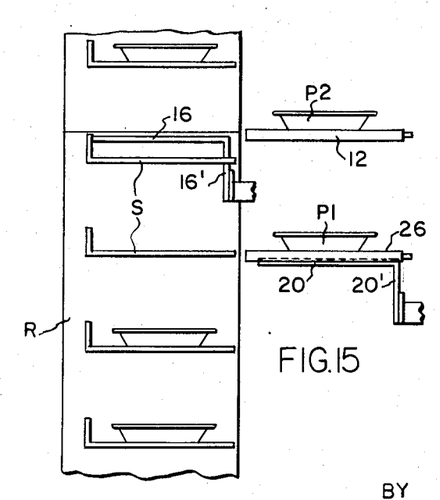

The operation will be described with particular reference to FIGS. 11 — 19, wherein the sequential positions of the loader transfer member 16', unloader and transfer member 20', shelves S of a rack R, are illustrated. In FIG. 11, the loader and unloader transfer members 16' and 20' respectively are shown in their "reset" positions. It will be assumed that the start switch 180 (line L3) has been closed and that a full complement of pie tins P have been loaded into the racks of the cooler for processing. The racks R move in the well-known manner in a continuous circuit in the cooler to move each of their shelves S during a predetermined time interval from the loading station L back to the unloading station UL. The drive motor M1 (line L5) will continue to operate to drive the pitman arms 164 (FIG. 1) which will move the bars 169 upwardly and thence downwardly to achieve the "Templex" action described in the referenced patent. It will further be assumed that the first tins P1 loaded into the unit have been completely processed and returned in the endless path to the unloading station UL to the position shown in FIG. 11. As the shelf S carrying tins P1 is stopped at the unload position UL, the cam operated contacts D7-NA (line L6) close to start the unloader motor M2 which moves the tine member 20' from the position shown in FIG. 11 to the position shown in FIG. 12. When the member 20' has reached the fully extended position in which it is shown in FIG. 12, the contacts U3a (line L8) close to energize the solenoid 108a which raises the member 20' from the position shown in FIG. 12 to the position shown in FIG. 13 to move the tins P1 off the grid fingers f of the rack shelf S being unloaded. There is a temporary swell period before the member 20' starts to return as the chain 87 negotiates the left-hand sprocket 92 mounted on the shaft 89a. The member 20' is then returned to the position shown in FIG. 14 above the discharge conveyor rollers 26 at which time the contacts U4A in line L9 close momentarily to energize the retract solenoid 108b for lowering the member 20' between the rollers 26 to deposit the tins P1 thereon as shown in FIG. 15. The contacts U5B are momentarily cammed open to deenergize the discharge conveyor motor M4 in line L10 to temporarily halt the rollers 26 during the transfer.

Figure 16:
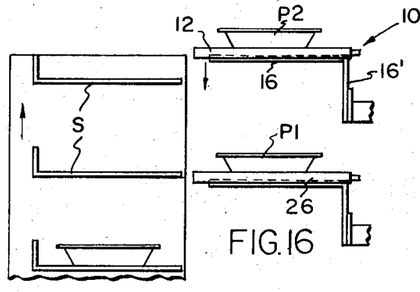

The conveyor motor M1, which is continually operating, then commences to index the shelves S upwardly. At this time, the contacts D9-NA (line L18) close to energize the loader motor M5, if the contacts LSR1 are closed. The contacts LSR1 close when the timer T times out to close the contacts T2. The timer T is set to start when the contacts EE1 are closed by the products leaving the vicinity of eye EE during the previous loading operation. IF the products are for some reason inadvertently not unloaded at the unloading station UL and travel upwardly to interrupt eye EE, the contacts EE1 open to deenergize relay LC and open contacts LC1 to stop the timer T until the products are removed manually. As the loader shelves S start to index upwardly, the loader conveyor motor M5 moves the transfer member 16' horizontally from the position shown in FIG. 15 to the position in which it is shown in FIG. 16 below the rollers 12 of the supply conveyor 10. When the member 16' reaches the position shown in FIG. 16, the contacts L2B (line L11) are cammed open to temporarily stop the motor M3 driving the supply rollers 12, and contacts L3a (line L17) are cammed closed to energize the advance solenoid 61b to move the conveyor 10 downwardly from the position in which it is shown in FIG. 16 to the lowered position shown in FIG. 17. The loader motor M5 which continues to operate then moves the member 16' from the position shown in FIG. 17 to the position shown in FIG. 18 in the path of the upwardly moving unloaded shelf S. The contacts LCR3 (line L16) open when the member 16' is fully extended to the position shown in FIG. 16, to deenergize the retract solenoid 61a for raising the conveyor 10. As soon as the loader fingers 16 clear the supply conveyor rollers 12, the contacts LCR3 are closed and the supply conveyor 10 is returned to its raised position. The shelf S continues to move upwardly to strip the tins P2 off the tines 16 as the shelf fingers f pass between the tines 16 to strip the tins P2 therefrom and move the tins to the position shown in FIG. 19. At this time, additional products P3 on the subjacent shelf are in position at the unload station UL and the contacts D7-NA again close to repeat the cycle and again move the transfer member 20' from the chain line position shown in FIG. 20 to the full line position shown in FIG. 20.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Bakery product apparatus for treating bakery products, such as pies in containers, comprising:
    a bakery processing unit including a plurality of vertically spaced, upwardly movable bakery product support shelves having transversely spaced, elongated open ended openings therethrough;
    bakery product conveying means having transversely spaced, elongated, open ended openings therein;
    apparatus including transversely spaced support means movable in a to-and-fro path between a first transfer position adjacent said bakery processing unit and a second transfer position adjacent said conveying means for successively transferring bakery products between said support shelves and said conveying means;
    said transfer apparatus and said product supporting shelves and said conveying means being mounted for relative vertical movement;
    means for relatively vertically moving at least one of said shelves and said transfer means when said transfer means is in said first transfer position to pass said transversely spaced support means through the openings in said one support shelf and transfer bakery products between said one shelf and said transfer means; and
    means for relatively vertically moving said conveying means and said transfer means when said transfer means is in said second transfer position to pass said transversely spaced support means through the openings in said conveying means and transfer said bakery products between said conveying means and said transfer means.

2. For use with a bakery processing unit, such as a cooler, including a plurality of spaced apart, shelves for supporting bakery products, such as pies, in containers, and for moving said products in a processing path of travel, each of said shelves comprising a first plurality of horizontally spaced support members; and means for indexing the shelves in said path of travel; rack unloading apparatus comprising:
    discharge conveying means including a second plurality of horizontally spaced apart support members for receiving and conveying bakery products to a discharge station;
    unloader transfer means for sequentially transferring processed bakery products from said shelves to said discharge conveying means including:
    carrier means movable in a to-and-fro path between a first position adjacent said shelves and a second position adjacent said conveying means;
    means for moving said carrier means in said to-and-fro path between said first and second positions;
    a third plurality of horizontally spaced support members intermeshable with said first and second pluralities of horizontally spaced support members and mounted for vertical movement on said carrier means between raised and lowered position;
    means for moving said third plurality of horizontally spaced apart support members upwardly between the horizontally spaced support members on one of said shelves from said lowered position to said raised position when said carrier means is in said first position to strip said bakery products from said one shelf; and
    means for moving said third plurality of horizontally spaced apart support members downwardly between said second plurality of horizontally spaced apart support members from said raised position to said lowered position when said carrier means is in said second position to deposit the bakery products on the support means of said conveying means.

3. The combination as set forth in claim 2 wherein said shelves are mounted on said unit for vertical movement; and means is provided for moving said shelves vertically.

4. The combination as set forth in claim 2 wherein said second plurality of horizontally spaced apart support members comprise driveable conveyor rolls for conveying the bakery products.

5. For use with a bakery processing unit, such as a cooler, having a plurality of spaced, movable bakery product support shelves, each of said shelves comprising a first plurality of transversely spaced support members, and means for moving the shelves in an endless path; shelf loading apparatus comprising:
    product supplying conveying means including a second plurality of transversely spaced movable support members for conveying bakery products in a longitudinal path;

loader transfer means including a third plurality of support members intermeshable with said first and second pluralities of support members and being movable from a position adjacent said conveying means for receiving bakery products therefrom to a discharge position adjacent said first support means for placing the bakery products in the path of said upwardly movable shelves; said loader transfer means and said product supplying conveying means being mounted for relative vertical movement between remote positions and product transfer positions;

means for relatively vertically moving said product supplying conveying means and said loader transfer means between said remote positions and transfer positions when said loader transfer means is in said receiving position so that said second and third pluralities of intermeshable support members pass each other to deposit the bakery products on said third support members;

means for moving said loader transfer means between said bakery product receiving position and said discharge position; and said means for moving said shelves in said endless path includes means for indexing at least one of said shelves upwardly when said loader transfer means is in said discharge position so that the plurality of support members on said one shelf moves between said third plurality of support members to strip the bakery products therefrom.

6. The combination of claim 5 wherein said product supplying conveying means is vertically movable between a raised position and a lowered position to deposit bakery products on said third plurality of support members; and said means for relatively moving said conveying means and said loader transfer means includes means for vertically moving said conveying means between said raised position and said lowered position.

7. The combination as set forth in claim 6 wherein said second plurality of transversely spaced support means comprises a plurality of driveable rollers and said third plurality of longitudinally spaced support members comprises a plurality of tines for receiving the bakery products.

8. The combination as set forth in claim 6 wherein said first plurality of transversely spaced support members comprises a plurality of transversely spaced bars; and said third plurality of transversely spaced support means comprises a plurality of tine members interleavable with said plurality of bars.

9. The combination of claim 6 including drive control means for causing said conveying means to be driven; and means for selectively intermittently operating said drive control means to render said drive control means inoperative when said conveying means is in said lowered position.

10. The combination of claim 6 including means pivotally mounting said supply conveying means for movement in an arcuate path between said raised and lowered positions.

11. The combination of claim 5 wherein said shelves are movable in an endless path; said indexing means includes means for indexing said shelves in an endless path; and including discharge conveying means including a fourth plurality of transversely disposed support members; shelf unloading apparatus downstream of said shelf loading apparatus for unloading the processed bakery products from said shelves and transferring them to said discharge conveying means.

12. The combination as set forth in claim 11 wherein said third plurality of transversely spaced support means is pivotally mounted on said loader transfer means to swing upwardly if a given product is inadvertently not removed from another of said shelves by said unloader apparatus and the upward movement of said shelves is interrupted by said given product engaging said third plurality of transversely spaced support means.

13. The apparatus as set forth in claim 12 including means responsive to the swinging movement of said third support means to interrupt the upward movement of said shelves.

14. The apparatus set forth in claim 12 wherein said shelves are mounted on said unit for vertical movement; and said indexing means includes means for indexing said shelves vertically when said transfer means is in said discharge position.

15. The combination as set forth in claim 11 wherein said shelf unloading apparatus comprises:

unloader transfer means including a fifth plurality of horizontally spaced support members movable from a position adjacent said shelves for receiving said bakery products and a discharge position adjacent said discharge conveying means for transferring the products thereto;

means for moving said unloader transfer means between said receiving and discharge positions;

said unloading transfer means and said shelves, and said discharge conveying means, being relatively movable between remote positions and product transfer positions;

means for relatively vertically moving said unloader transfer means and said shelves when said unloader transfer means is in said receiving position to relatively move said fifth plurality of horizontally spaced members and the first plurality of horizontally spaced members on another of said shelves between each other to transfer bakery products from said another shelf to said unloader transfer means;

means for relatively vertically moving said unloader transfer means and said discharge conveyor means when said unloader transfer means is in said discharge position to relatively move said fourth and fifth pluralities of horizontally interposed support members between each other to transfer bakery products from said unloader transfer means to said discharge conveyor means.

16. The combination of claim 15 wherein said supply conveyor means is mounted for vertical movement; said means for relatively vertically moving said supply conveyor means and said loader transfer means includes means for moving said supply conveyor means between a raised position and a lowered position to move said second plurality of support members between said third plurality of support members to transfer the bakery products thereto when said loader transfer apparatus is in said product receiving position.

17. The combination as set forth in claim 16 wherein said second and fourth pluralities of support members comprise first and second pluralities of conveyor rolls respectively, first and second drive means for driving said first and second pluralities of conveyor rolls; and means for intermittently rendering said first drive means inoperative when said loader transfer means is in said receiving position.

18. The combination as set forth in claim 17 wherein said supply and discharge conveyor means are in superposed relation.

19. The combination as set forth in claim 16 wherein said unloader transfer means includes carrier means movable in a to-and-fro path between said receiving position adjacent said shelves and said discharge position adjacent said discharge conveyor means, said fifth plurality of horizontally spaced members comprising a plurality of spaced apart tines mounted for vertical movement on said carrier means between raised and lowered positions; said means for relatively vertically moving said fifth plurality of members and said discharge conveying means and said shelves comprise means for vertically moving said tines between said first plurality of members from said lowered position to said raised positions when said unloader transfer means is in said receiving position, and for moving said tines between said fourth plurality of support members from said raised position and to said lowered position when said unloader transfer means is in said discharge position to transfer bakery products to said discharge conveyor means.

20. In combination with a bakery processing unit, such as a cooler, including a plurality of spaced, upwardly movable bakery product support shelves having pluralities of open ended openings therethrough, and means for indexing the shelves upwardly;
product supplying conveyor means having a first plurality of transversely spaced rollers for moving the products in a first path and movable between raised and lowered positions;
loader means including a first plurality of transversely spaced fingers generally vertically aligned with said openings and being reciprocatable in a to-and-fro path from a receiving position adjacent said supplying conveying means and a discharge position adjacent said shelves to position said bakery products in the path of said upwardly moving shelves;
means for moving said supplying conveyor means between said raised and lowered positions when said loader means is in said receiving position to move the first plurality of rollers between said first plurality of spaced fingers and transfer the products thereto;
means for reciprocating said loader means between said receiving position and said discharge position to dispose said bakery products in the path of one of said upwardly moving shelves which strips the products from the fingers as the transversely spaced fingers of said one shelf pass through the openings in said shelves and move them through said unit for processing.

21. The combination as set forth in claim 20 including:
discharge conveyor means including a second plurality of transversely spaced rollers for moving the bakery products in a second path; and
unloader means for transferring bakery products from said shelves to said conveying means, said unloader means being mounted for movement in an endless path from a lowered position below another one of said shelves to a raised position above said another shelf, to a raised position above said discharge conveying means, to a lowered position below said discharge conveying means, and then to said lowered position below said another shelf; and means for moving said unloader means in said endless path.

22. Apparatus for successively transferring bakery products, such as pies in containers, to vertically spaced, upwardly movable, vertically spaced support shelves in a bakery processing unit, such as a cooler, said shelves being provided with transversely spaced, elongated openings therethrough, said apparatus comprising:
vertically movable product supplying conveying means for conveying bakery products in a path of travel and having transversely spaced, elongated open ended openings therein;
loader means movable between a receiving position adjacent said product supplying conveying means for receiving bakery products from said product supplying conveying means and a depositing position adjacent one of said shelves to transfer bakery products to a position in the path of said shelves as said shelves are moved upwardly, said loader means including transversely spaced support means for passing through the openings in said conveying means when said transfer means is in said receiving position and said supply conveying means is moved downwardly, and for passing through the openings in one of said shelves when said transfer means is in said depositing position and said one shelf is moved upwardly;
means for sequentially moving said loader means between said receiving and depositing positions;
means for moving said supply conveying means between a raised position and a lowered position to deposit said bakery products on said transversely spaced support means, when said loader means is in said receiving position to transfer products thereto; and
means for indexing at least said one shelf upwardly to strip the bakery products from said loader means when said loader means is in said depositing position.

* * * * *